United States Patent Office 3,715,022
Patented Feb. 6, 1973

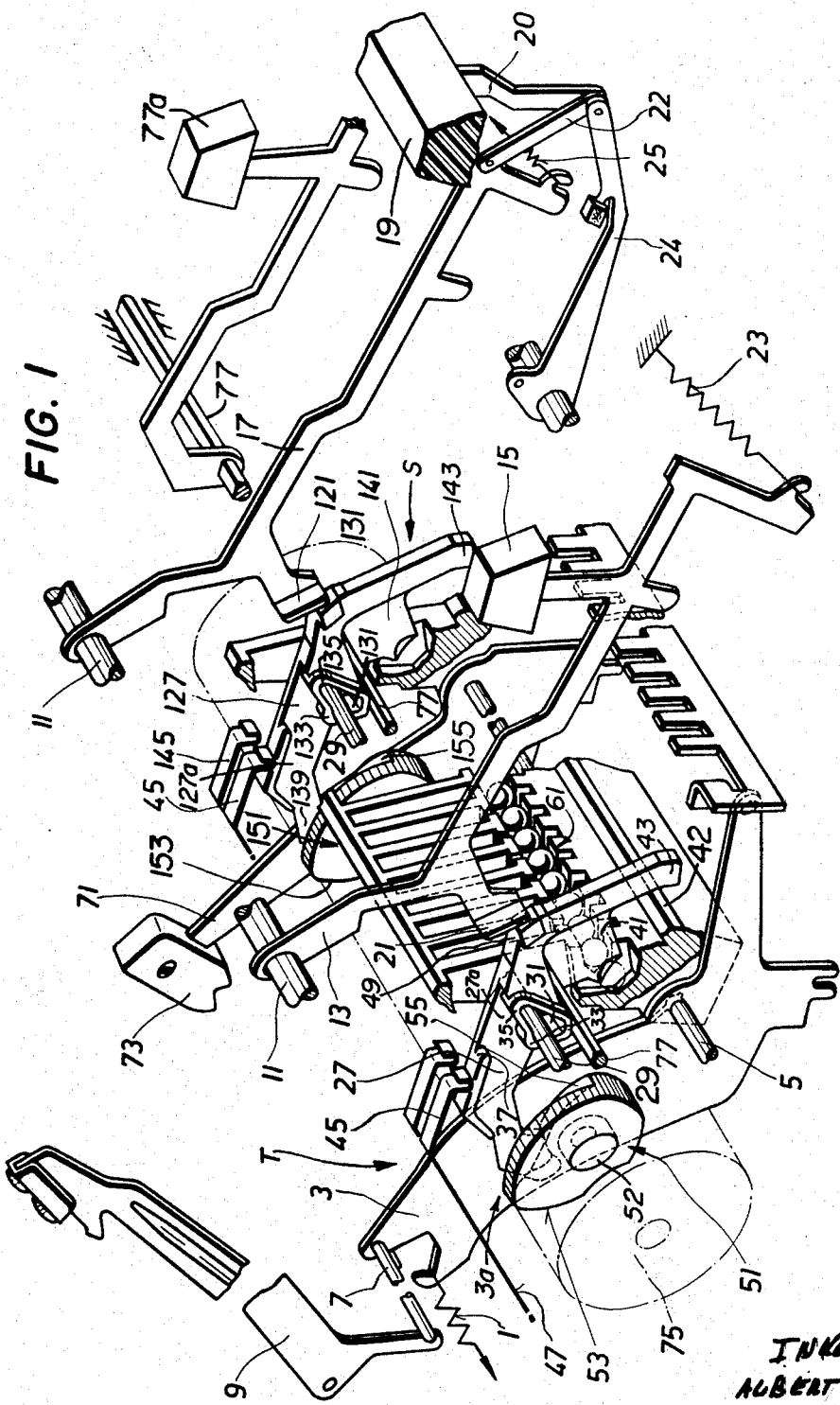

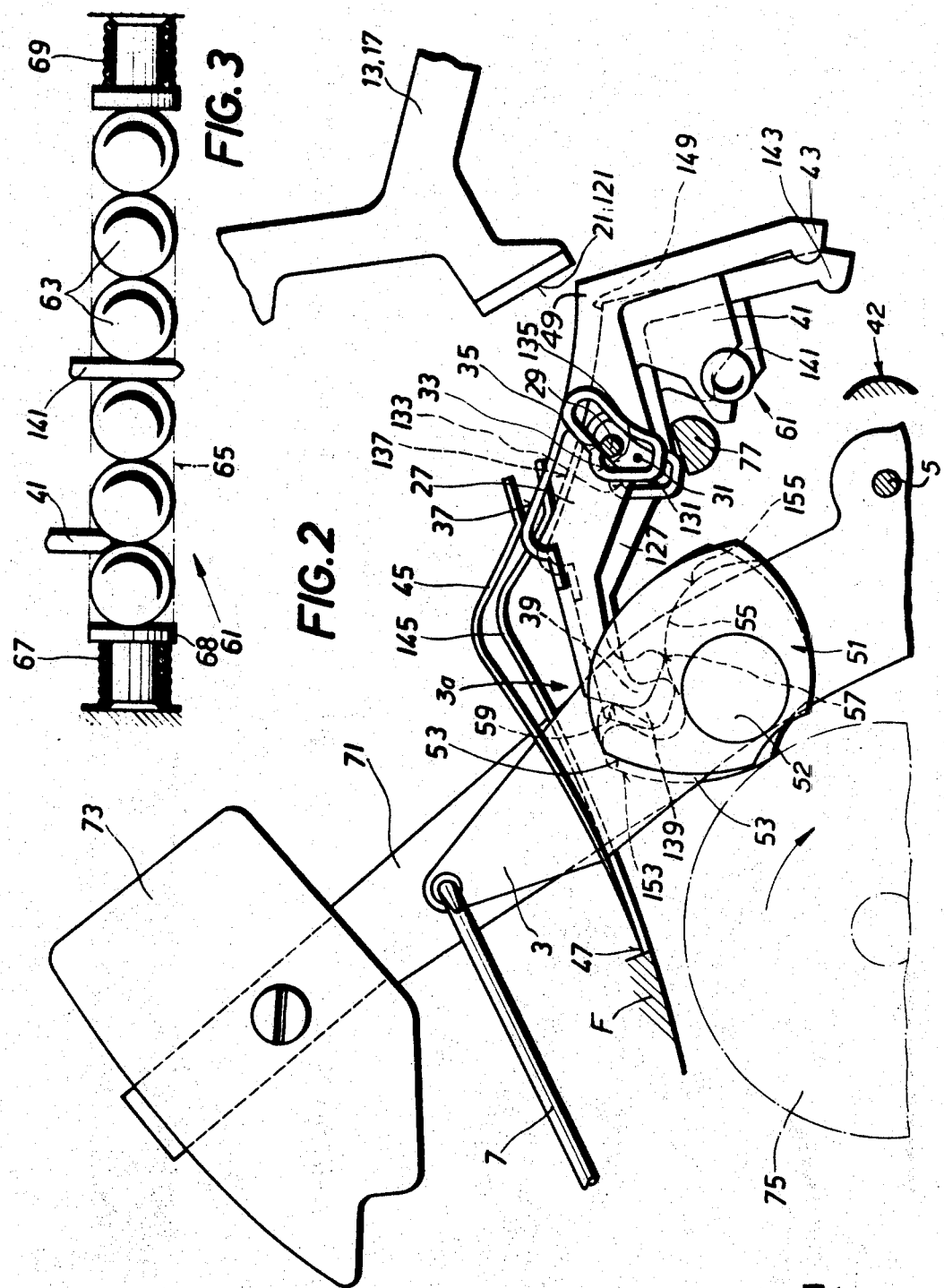

3,715,022
APPARATUS FOR POSTPONING AND STORING KEY CONTROLLED FUNCTIONS OF A TYPEWRITER
Albert Rix, Wilhelmshaven, Georg Werner, Heidmuehle, and Hans Fuchs, Wilhelmshaven, Germany, assignors to Olympia Werke AG, Wilhelmshaven, Germany
Continuation-in-part of application Ser. No. 40,514, May 26, 1970. This application Nov. 12, 1970, Ser. No. 88,767
Claims priority, application Germany, Nov. 15, 1969, P 19 57 471.1
Int. Cl. B41j 5/08
U.S. Cl. 197—98                    10 Claims

ABSTRACT OF THE DISCLOSURE

The type action mechanisms and the function releasing mechanisms of a typewriter, for example the spacing device with the space bar, or the case shifting device, have control means cooperating with blocking means to permit only one mechanism to operate, while any other mechanism actuated during operation of a first actuated mechanism, is blocked in a storage position until the first operation is completed, whereupon the respective control means is moved by a spring to a position for starting the operation of the second actuated mechanism. If the space bar is actuated before a previously actuated type action returns to its position of rest, the spacing function is stored, and takes place when the operation of the type action is completed.

CROSS REFERENCE TO RELATED APPLICATION

The present application is a continuation-in-part application of our copending application Ser. No. 40,514, filed on May 26, 1970, and entitled "Apparatus For The Control of Type Printing Sequences."

BACKGROUND OF THE INVENTION

The present invention relates to an apparatus for postponing and storing key controlled functions of a typewriter in such a manner that, if a function is initiated before a previously initiated function has been completed, the respective function is mechanically stored and continued only after the first initiated function has been completed.

The above-referred to U.S. patent application Ser. No. 40,514 discloses a typewriter in which the sequence of operations of type actions under the control of keys, is automatically controlled. Each type action includes a control means which is spring biassed, and arrested in a position of rest. Upon actuation of the respective key, the respective control means is moved to a released position in which the biassing means is effective to move the control means to an actuated position engaging a ball blocking device so that no other type action can be actuated until the operation of the first actuated type action is completed. The apparatus permits the sequential operation of type actions for making succesive imprints, even if a type action is actuated by the respective key before the operation of the preceding type action has been completed. However, it is not possible in accordance with the prior art, to mechanically store an impulse for actuating another mechanism which effects a function of the typewriter. For example, it is not possible to postpone functions such as a spacing step, the carriage return, the case shifting, and the line spacing, until another function, or the making of an imprint by a type bar is completed.

The space bar is one of the most frequently operated keys of a typewriter, and is usually actuated by the thumb. Since the thumb operates only the space bar, it is often operated before the preceding operation of a type action has been completed, which causes a disturbance, since, without storing of the impulse provided by the space bar, the respective intended spacing operation does not take place, and the next following letter is typed by the same or another type action directly following the first typed letter.

Particularly at a high typing speed, it frequently happens that the space bar, or any other key controlling a function of the typewriter, is actuated too soon after the actuation of another key, so that the respective function initiating impulse is lost.

SUMMARY OF THE INVENTION

It is one object of the invention to provide an apparatus for postponing and storing key controlled functions of a typewriter in the event that the respective function is initiated before the preceding function has been completed.

Specifically, it is an object of the invention to postpone a spacing operation, a line shifting operation, a case shifting operation, a carriage return, or tabulation of the carriage until a previously initiated operation of a type action has been completed.

Another object of the invention is to provide a typewriter with an apparatus which assures the correct sequence of different functions of the typewriter by making possible the genuine storing of two directly successive input impulses, for example provided by actuation of a type action controlling key, and by the space bar.

With these objects in view, the present invention provides each type action mechanism, and at least one function releasing mechanism, for example the space bar mechanism, with a control means cooperating with blocking means in such a manner that the simultaneous actuation of two mechanisms is prevented, and that when two mechanisms are actuated in too rapid succession, the impulse controlling the operation of the second started operation is stored until the first started operation is completed, and then takes place automatically.

An embodiment of the invention comprises a plurality of type action mechanisms and at least one function releasing mechanism, such as the spacing mechanism. Each mechanism includes a control means, preferably a lever having an opening, arresting means for holding the control means in a position of rest, and preferably including an arresting rod passing through the openings of the control levers, biassing means, preferably including a plurality of spring members for urging the control means into engagement with the arresting means, a key lever means for actuating the control means to move out of the position of rest to a position released by the arresting means and biassed by the biassing means toward an actuated position, and a drive member actuated by the control means in the actuated position to cooperate with the power drive means for effecting an operation of the respective mechanism and consequent return of the actuated drive member and of the actuated control means to positions of rest whereby the biasing means are tensioned.

Blocking means are provided and operated by each of the control means in the actuated position to block movement of any other control means to the actuated position, so that the respective other control means moves from the released position to a storage position while being urged by the biasing means toward the actuated position and moves to the actuated position when the power drive means effects return of the first actuated control means from said actuated position to the position of rest whereby at any time only one of the mechanisms can be operated, and any other too early actuated mechanism performs its function only after the function of the first actuated mechanism has been completed.

In the preferred embodiment of the invention, the control means include control levers arranged in a row, and the drive members include drive levers arranged in a row and carrying rotary drive cams cooperating with the power roll of the power drive means. All control levers, and all drive levers, respectively, have substantially the same shape irrespective of whether they form part of a type action mechanism, or of a function releasing mechanism. Each control lever cooperates with the drive cam of the respective mechanism to be returned to its initial position of rest after the operation has been completed. Each control lever has a blocking plate cooperating with balls of a blocking device which permits only one control means to assume the actuated position for effecting an operation, such as the printing of a character by the type bar of a type action mechanism, or a function, such as a spacing step under the control of the space bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary perspective view illustrating an embodiment of the invention in which the operation of the spacing mechanism under the control of a space bar is blocked during the operation of a type action;

FIG. 2 is a fragmentary side view illustrating a detail of the embodiment of FIG. 1; and FIG. 3 is a fragmentary plan view illustrating a blocking means provided in the embodiment in FIGS. 1 and 2.

DESCRIPTION OF THE PREFERRED EMBODIMENTS

Referring now to the drawing, and more particularly to FIG. 1, a plurality of type action mechanisms for operating type bars 9 is provided, only one type action mechanism T being shown in detail. At least one function releasing mechanism, shown to be a spacing mechanism S for carrying out a spacing function is also provided aligned with the type action mechanisms. Each type action mechanism T includes a drive means 3a including a drive lever 3 mounted on a shaft 5 for angular movement, and a drive cam 51 rotatably mounted by means of a shaft or journal 52 on each drive lever 3, cooperating with a power roll 75. Each drive lever 3 is biassed by a spring 1 and connected by a wire 7 with a type bar 9.

Key levers 13 having keys 15, and spacing key lever 17 are mounted for angular movement on a stationary shaft 11. The key lever 17 of the spacing mechanism S is operated by a space bar 19 which is secured to a stem 20 whose other end is pivotally connected with a link 22 connected with the key lever 17 and a turnable arm 24. The type action key lever 13 and the spacing key lever 17 respectively have projecting portions 21 and 121, and are biassed by springs 23 and 25, respectively. Each type action mechanism T includes a control means 27, and the spacing mechanisms S includes a control means 127 having substantially the same shape. Control means 27, 127 are arranged in a row, and have openings 31, 131 through which an arresting rod 29 passes by which the control means 27, 127 are supported for movement. Control means 27 and 127 include control levers 27a, 127a having abutment faces 37 and 137, respectively, on which springs 45 and 145 abut, respectively. Springs 45 and 145 are fingers of a resilient comb 47 which is secured to a frame portion F. The control means 27, 127 have cam follower portions 39 and 139, respectively, see FIG. 2, and also abutment end portions 43, 143, respectively, see FIG. 2 cooperating with a stop rod 42 which is engaged by abutment end portions 43 or 143. Abutment portions 49 and 149 of the control means 27, 127 respectively cooperate with projections 21 and 121 of the key lever 13 and the spacing key lever 17.

The rotary drive cams 51 and 151 include a driving cam portion 53, 153 cooperating with the power roll 75, and another cam portion 55, 155 cooperating with the noses 57 and 59 of the follower portions 39, 139 of control means 27 and 127, respectively. Cam portions 153 and 155 of the spacing mechanism S correspond in shape and operation to the cam portions 53 and 55 of the type action mechanism T. A blocking means 61 schematically shown in FIGS. 1 and 2, and shown in greater detail in FIG. 3, is provided, and has a channel 65 closed at the ends by pressure pistons 68 biased by springs 67 and 69 against the row of blocking balls 63. The length of the row of blocking balls 63 is less than the length of the channel 65 by a distance which is equal to the thickness of the blocking portion 41 of control means 27, and to the blocking portion 141 of spacing control means 127.

While only part of the spacing mechanism S is shown in the drawing, it will be understood that other function releasing mechanisms could be provided in alignment with the type action mechanism T and the spacing mechanisms. All control means 27, 127, and all cams 51, 151 have the same shape, so that the cost of manufacture is reduced.

The rotary cam 151 is mounted on a drive lever 71 which has a similar shape as the drive lever 3 of the type action mechanism T, but is not connected with a type bar 9. Instead, a body 73 is secured to drive member 71 for adding a mass required for the transmission of force.

Each control means 27 has an opening 31, and each control means 127 has an opening 131. Openings 31 and 131 are respectively bounded by recessed detent portions 33, 133, and guide portions 35, 135. In the normal position of rest shown in FIG. 1, springs 45 and 145 urge control means 27, 127 to positions of rest in which the detent portions 33, 133 are engaged by the arresting rod 29, while the noses 57, 59 abut cam portions 55, 155 so that control means 27, 127 cannot turn in the position of rest in counterclockise direction. Only when control means 27, 127 are operated by key levers 13, 17, drive cams 51, 151 cooperate with power roll 75.

In this position of rest, the blocking plate portions 41 and 141 are located outside of the blocking means 61.

The apparatus operates in the following manner:

When a key lever 13 is operated, the projection 21 engages the abutment edge 49 of the control means 27, and displaces the same so that the detent portion 33 is separated from arresting rod 29, while the respective spring 45 is tensioned. When control means 27 is released in this manner, key lever 13 can return to its normal position of rest, but the impulse provided by key lever 13 is already stored due to the displacement of control means 27 with the detent portion 33. The respective spring 45 urges the control means 27 further to an actuated position in which blocking portion 41 is located between two balls 63. As is apparent from FIG. 3, the blocking portion 41 can only enter between two balls 63 of the blocking means 61, only if no other blocking portion 41 or 141 is already located in the blocking means 61, as shown for the blocking portion 141 in FIG. 3.

Assuming that the blocking portion 41 has entered the blocking means 61 due to the pressure of the respective spring 45, the guide portion 35 of the edge of opening 31 moves along the arresting rod 29 until the blocking plate 41 is fully inserted into the blocking means 61, while the control means 27 turns about arresting rod 29. Cam 51 which is engaged by the follower portion 39 of control means 27, is thus moved to a position engaging the power roll 75 so that the drive lever 3 is actuated and angularly moves about shaft 5 whereby the respective type bar 9 is operated to make an imprint.

The power roll 75 acts on the drive cam portion 53 of cam 51 to rotate the cam 51 counterclockwise whereby drive lever 3 is angularly displaced in clockwise direction. After the type bar 9 has been actuated, cam 51 continues to rotate so that cam portion 55 due to its curvature moves the control means 27 back to its rest position in which the detent portion 33 resiliently abuts arresting rod 29 while the tension of spring 45 is again increased. Whenever a control means 26 is released from its position of rest by actuation of the corresponding key lever 13, the tensioned spring 45 urges the respective control means 27 to the actuated position in which the plate portion 41 is located in the blocking means 61, and the return of control means 27 by cam 51 to its position of rest, causes a retraction of the blocking plate portion 41 from the blocking means 61 until the control means 27 again assumes its position of rest in which the blocking plate portion 41 is located outside of the blocking means 61.

The spring biased pressure means 67, 68, 69 of the blocking means 61, see FIG. 3, have the advantage that the insertion of the plate portion 41 of each control means 27 requires the same force since always the same number of balls 63 has to be displaced.

Assuming now that directly after actuation of a key lever 13, the space bar 19 and spacing key lever 17 are displaced, before the operation of the respective type action mechanism T has been completed, control means 127 is displaced out of its position of rest to a released position in which the respective detent portion 133 no longer engages the arresting rod 29.

Consequently, the respective spring 145 urges control means 127 toward the actuated position in which its blocking portion 141 is located between the balls 63. However, since the blocking portion 41 of a type action mechanism T has already entered the blocking means 61, the blocking portion 141 cannot enter between the balls 63 at first, but as soon as the blocking plate portion 41 is retracted from the blocking means 61, spring 145 urges control means 127 to the actuated position in which its blocking plate portion 141 is located between two balls 63.

FIG. 2 illustrates a storage condition of the apparatus in which the space bar 19 has been actuated to effect a spacing step, while before completion of the spacing step, a key 15 of a type action was actuated.

Operation of the space bar 19 has displaced key lever 17 whose projection 121 has pushed control means 127 to a released position which permits spring 145 to move control means 127 to the actuated position in which its blocking plate portion 141 is located between two balls 63 in the blocking means 61, as shown in FIGS. 2 and 3. In this actuated position of control means 127, cam 151 is displaced to a position cooperating with the power roll 75, so that the spacing mechanism S is actuated by the drive member 71 in a manner which is known to those skilled in the art. Drive member 71 of the spacing mechanism S and drive lever 3 of a type action mechanism T cooperate with a conventional universal bar, not shown, substantially as described in U.S. Pat. No 3,269,511. Key 15 and key lever 13 were operated before the spacing operation was terminated so that blocking portion 141 is still located in the blocking device 61 when key 15 is depressed.

Depression of key 15 causes angular movement of key lever 13 about shaft 11 so that projection 21 acts on abutment portion 49 of control means 27 so that the detent portion 33 is pressed away from arresting rod 29, and the spring 45 pushes control means 27 downward to a position in which arresting rod 29 is located between the detent portion 33 and the guide portion 35, as shown in FIG. 2. Spring 45 now acts on abutment face 37 of control means 27 to push the same further, but control means 27 cannot move to a fully actuated position since its blocking plate portion 41 abuts two balls 63 as shown in FIG. 3 due to the fact that the balls 63 are already blocked by the blocking plate portion 141 of the spacing mechanism S.

Spring 45 continues to press control means 27, and more particularly blocking plate portion 41 against the balls 63 so that, as soon as the spacing operation has been completed, and cam 151 has returned control means 127 to its position of rest in which blocking plate portion 141 is retracted from the blocking means 61, the spring 45 urges the control means 27 from the storage position shown in FIG. 2 to the actuated position located between two balls 63, in which position the type action mechanism T is operated to obtain an imprint by type bar 9.

By suitably constructing the surfaces of the blocking plate portions 41, 141, the sequence of the respective functions can be influenced in such a manner that during the performance of one function, already the second function can be initiated for overlapping operational periods.

A third mechanism can be actuated as soon as the control means 27 or 127 of the first actuated mechanism T or S has been returned to its position of rest, and the blocking plate portion 141 or 41 of the second actuated mechanism has moved to the position located in the blocking means 61.

If two control means 27 or 127 are simultaneously operated at exactly the same time, the blocking means 61 becomes effective to block entry of the blocking plate portions 41 or 141 of both of the two actuated mechanisms T and S, so that neither printing, nor spacing operations can take place. A clearing rail 77 is then operated by a special key 77a, see FIG. 1, which returns all control means 27, 127, which are in the storage position in which blocking plate portion 41 is shown in FIG. 3, to the position of rest shown in FIG. 1, in which the detent portions 33 and 133 engage the arresting rod 29 under the action of springs 45 or 145.

Due to the arrangement of the invention, actuations taking place in such a rapid succession that the machine cannot perform the released functions quickly enough, are automatically postponed and stored until the preceding operation has been completed.

It will be understood that each of the elements described above, or two or more together, may also find a useful application in other types of apparatus for postponing and storing type action operations and other key controlled functions of a typewriter differing from the types described above.

While the invention has been illustrated and described as embodied in an apparatus blocking simultaneous operations of a typewriter, and storing premature actuation impulses until a previously started function has been completed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for postponing and storing key controlled functions of a typewriter having a single power roll, comprising a plurality of type action mechanisms, and at least one function controlling mechanism, each mechanism including one movable control means, one spring urging each control means in one direction from a position of rest to an actuated position, arresting means for arresting said control means in said position of rest against movement toward said actuated position, a key lever means movable to a depressed position displacing said control means to move out of said position of rest to a position released by said arresting means and moved by said spring toward said actuated position, and drive means actuated by said one control means in said actuated position to cooperate with said power roll for effecting an operation of the respective mechanism and consequent return of said actuated drive means and of said actuated control means to said position of rest while the respective spring is tensioned; and blocking means operated by any one of said control means in said actuated position to block any other control means, released by an other key lever means, in a storage position so that said other control means cannot be moved by the respective other spring to said actuated position until after said power roll has effected return of said one control means from said actuated position to said position of rest whereby the operation of the mechanism including said other control means can be started by depression of said other key lever means during, and is automatically completed after the operation of the first actuated mechanism.

2. Apparatus as claimed in claim 1, wherein said function releasing mechanism is a spacing mechanism, and wherein said key lever means of said spacing mechanism includes a space bar.

3. Apparatus as claimed in claim 1, wherein said drive means of said type action mechanisms and of said function releasing mechanism include drive levers having substantially the same shape and being arranged in a row along said power roll, and a rotary drive cam rotatably mounted on each drive lever; and wherein said drive cams are arranged in a row along said power roll for cooperation with said power roll.

4. Apparatus as claimed in claim 3, wherein said control means of said type action mechanisms and of said function releasing mechanism include control levers having substantially the same shape and being arranged in a row; and wherein each control lever has a drive portion cooperating with the respective drive cam, a blocking portion cooperating with said blocking means, and a portion engaged by said biasing means.

5. Apparatus as claimed in claim 4, wherein said blocking means include a channel closed at the ends thereof, and a row of blocking balls in said channel, said row of blocking balls being shorter than said channel by a predetermined distance; wherein said blocking portion of each control lever includes a blocking plate having a thickness substantially equal to said predetermined distance; and wherein said blocking plate is located between two of said blocking balls in said actuated position of the respective control means so that only one control means can move to said actuated position whereas said blocking plate of any subsequently released control means abuts at least one of said blocking balls in said storage position due to the action of said biasing means, and moves to said actuated position due to the action of said biasing means when said blocking plate of the first actuated control means moves out of said row of blocking balls due to the action of said drive cam.

6. Apparatus as claimed in claim 5, wherein said blocking means include spring biassed pressure members at the ends of said channel urging said blocking balls of said row toward each other and to a central position.

7. Apparatus as claimed in claim 6, wherein each control lever has an opening bounded by an edge including a detent portion and a guide portion; and wherein said arresting means includes an arresting rod passing through said openings and located in said detent portion due to the action of said biasing means when the respective control lever is in said position of rest, and being released by said detent portion when said control lever is moved by said key lever means to said released position, said guide portion moving across said arresting rod during movement of said control lever to said actuating position so that a control lever in said actuated position cooperates with said arresting rod with the end of said guide portion, while the next released control lever cooperates with said arresting rod between said detent portion and said guide portion while held by said blocking balls of said blocking means in said storage position.

8. Apparatus as claimed in claim 1, wherein each control means has an opening bounded by an edge including a recessed detent portion and a guide portion; and wherein said arresting means include an arresting rod passing through said openings and located in said recessed detent portion due to the action of said biassing means when the respective control means is in said position of rest, and being released by said recessed detent portion when said control means is moved by said key lever means to said released position, said guide portion moving across said arresting rod during movement of said control means to said actuated position so that a control means in said actuated position cooperates with said arresting rod with the end of said guide portion, while the next released control means cooperates with said arresting rod between said recessed detent portion and said guide portion while held by said blocking means in said storage position.

9. Apparatus as claimed in claim 1, wherein said control means of said type action mechanisms and of said function releasing mechanism have substantially the same shape and are arranged in a row; wherein said biasing means include a row of interconnected spring members engaging said control means of said type action mechanisms and of said function releasing mechanism, respectively; and wherein said arresting means include an arresting rod extending across said control means of said row and being engaged by said control means due to the action of said spring members.

10. Apparatus as claimed in claim 9, wherein said drive means of said type action mechanisms and of said function releasing mechanism each include a drive lever, and a drive cam rotatably mounted on said drive lever and actuated by said power drive roll to move an actuated control means from said actuated position back to said position of rest; and wherein all said drive levers and drive cams have substantially the same shape, respectively.

References Cited

UNITED STATES PATENTS

| | | | |
|---|---|---|---|
| 3,086,635 | 4/1963 | Palmer | 197—16 |
| 3,191,740 | 6/1965 | Smusz et al. | 197—16 |
| 3,352,399 | 11/1967 | Madison | 197—17 X |
| 2,714,948 | 8/1955 | Schremp et al. | 197—17 |
| 2,236,413 | 3/1941 | Pirnat et al. | 197—107 |
| 3,026,984 | 3/1962 | Shelton | 197—17 |
| 1,932,914 | 10/1933 | Shelton et al. | 197—16 X |
| 1,963,285 | 6/1934 | Woodward | 197—17 X |
| 3,152,759 | 10/1964 | May | 197—98 U X |
| 3,181,680 | 5/1965 | Cappotto et al. | 197—17 |
| 3,353,646 | 11/1967 | Young | 197—16 |

OTHER REFERENCES

IBM Technical Disclosure Bulletin, Typebar Typewriter with Stroke Storage, W. A. Heidt, vol. 11, No. 11, April 1969, pp. 1421–1422.

ERNEST T. WRIGHT, JR., Primary Examiner

U.S. Cl. X.R.

197—17, 107